(No Model.)
E. LINDNER.
CHUCK FOR TURNING LATHES.
No. 452,496.   Patented May 19, 1891.
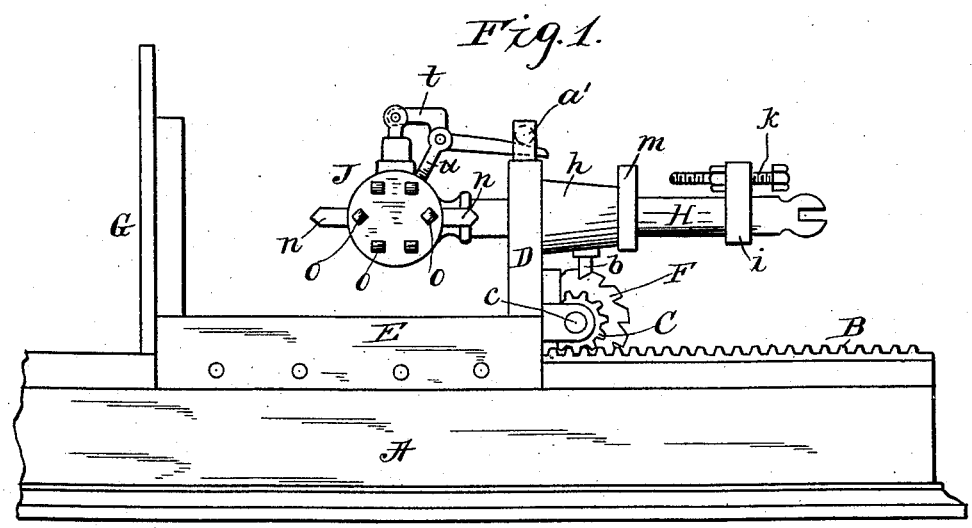
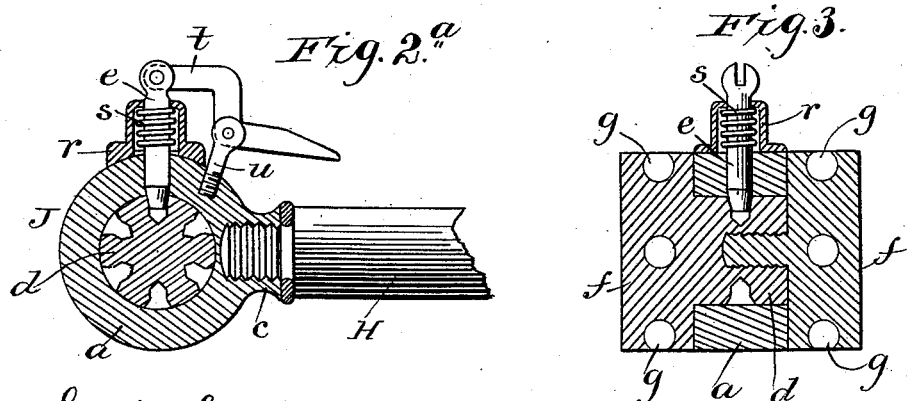
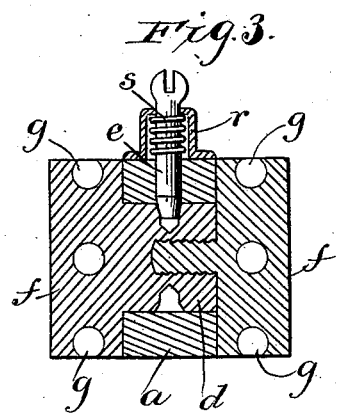
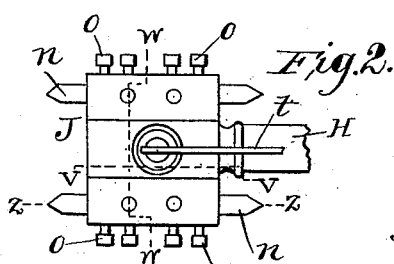
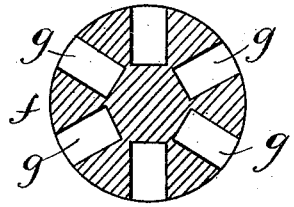
Witnesses:
W. E. Bowen
Benj. Miller
Inventor:
Ernst Lindner

UNITED STATES PATENT OFFICE.

ERNST LINDNER, OF NEW YORK, N. Y., ASSIGNOR TO LINDNER & REMIG, OF SAME PLACE.

CHUCK FOR TURNING-LATHES.

SPECIFICATION forming part of Letters Patent No. 452,496, dated May 19, 1891.

Application filed September 16, 1890. Serial No. 365,145. (No model.)

*To all whom it may concern:*

Be it known that I, ERNST LINDNER, a citizen of the United States, and a resident of New York, in the county of New York and State of New York, have invented certain new and useful Improvements in Chucks for Turning-Lathes, of which the following is a specification.

This invention has reference to chucks for turning-lathes, such lathes as that illustrated in my Letters Patent dated January 31, 1888, No. 377,080; but its use is not confined to the construction of lathes therein described.

My object is to devise a chuck that may be advantageously employed when articles are being made on the lathe which require more than one operation of tools supported in or carried by the chuck to complete them.

The construction of my chuck is such that a series of tools carried thereby may with ease and rapidity be consecutively brought into position as required for performing the needful operations on the article being fashioned without removal of the chuck from the dead-spindle of the lathe. The chuck is duplex, so that it may be fitted with a series of pairs of tools so disposed in its tool-sockets as to enable the making of two articles of dissimilar character simultaneously.

To enable my invention to be understood, and to be constructed and used by others interested in the art to which it relates, I have hereinafter described the same and its mode of operation, and in the claims at the end of this description I have set out the features of novelty for which I desire the protection of Letters Patent.

In the accompanying drawings, which form a part of this description, and wherein like parts are indicated by like letters of reference in the several views, Figure 1 is a side elevation of a portion of a turning-lathe having operatively mounted on the dead-spindle thereof my newly-devised duplex chuck. Fig. 2 is a top plan view of the chuck fitted to the dead-spindle of the lathe. Fig. $2^a$ is a section on the line $v$ $v$ of Fig. 2. Fig. 3 is a section through the chuck on the line $w$ $w$ of Fig. 2; and Fig. 4 is a section through the chuck on the line $z$ $z$ of Fig. 2, the tools being removed from the chuck.

Referring to the drawings, A indicates a lathe-bed of any of the usual forms.

B is a centrally-arranged cog-rack, which co-operates with a pinion C, mounted on shaft $c$, which latter is supported in bearings fixed to or formed with the upright flange D. The flange D rises from the rear end of the sliding tail-stock E. The tail-stock is adapted to be moved forward and backward on the lathe-bed, and by means consisting partly of the indexing and gaging wheel F and co-operating bolt $b$ this forward movement is a progressive one. The front end of the tail-stock E is provided with an upright flange G, which is adapted to carry the bushings for supporting the rods or bars of material to be operated on by the tools in the chuck. The flange D supports the dead-spindle or tool-stock H, which slides in the hub $h$.

To the spindle H is fixed the collar $i$, having an adjustable screw $k$ passing through it and which is adapted to come in contact with a second collar $m$, fixed to the hub $h$ to limit the movement of the dead-spindle H.

The front end of the dead-spindle or tool-stock H is screw-threaded to receive the chuck J. As already stated, this chuck is particularly adapted for use when the lathe is employed for making two dissimilar articles at the same time. The chuck J comprises a ring $a$, having an internally screw-threaded projection $c$, by means of which the chuck is secured to the dead-spindle H, an interior hub $d$, provided with a series of holes in its periphery, into which the spring-actuated bolt $e$ is adapted to seat to lock the hub stationary within ring $a$, and tool-sockets $f$, formed integral with hub $d$ or separately and fixed thereto in any suitable manner, so as to revolve with said hub. The tool-sockets $f$ are provided with holes $g$ in their peripheries to receive the tools $n$, which are held against displacement by means of screws $o$, as seen in Fig. 1. On the top of ring $a$ there is secured a cap $r$, which incloses a spring $s$, encircling the bolt $e$. To the outer end of bolt $e$ is pivotally connected one end of the bent lever $t$, fulcrumed on screw $u$, fixed in the top of ring $a$, the opposite or free end of said lever $t$ being beveled and adapted to slide beneath a roller $a'$, supported in the top of the upright flange D.

(See Fig. 1.) It will be understood that as the dead-spindle H is drawn back for the purpose of readjusting the tool-sockets $f$ of the chuck to bring into operative positions a different set of tools, the beveled free end of lever $t$ will slide beneath roller $a'$ with the effect of lifting bolt $e$ out of the hole of hub $d$, in which it was seated, thus permitting the tool-sockets to be turned by hand with the hub to which they are secured. When the desired tools have been brought to the front the movement which carries the dead-spindle and attached chuck outward will release the bolt and permit it to drop into one of the holes in the hub $d$, thus locking the tool-sockets in place. It will be noticed that the number of holes in each tool-socket corresponds to the number in the hub $d$, so that when a pair of tools is presented in proper position for work one of the holes of the hub will occupy a place in line with bolt $e$ to receive the latter as the lever $t$ is released by its beveled end being withdrawn from beneath the roller $a'$, supported in the top of flange D.

With the use of this chuck it will be seen that the various tools with which its tool-sockets are provided may quickly and easily be brought into position for use without the necessity of removing the chuck from the dead-spindle.

It is obvious that by the employment of my duplex chuck with a machine of proper construction, and fitting the chuck with the required tools appropriately disposed in its tool-sockets two dissimilar articles may be made simultaneously and the work performed in a rapid manner. The chuck may also be employed for making two similar articles simultaneously, as is obvious.

Having thus described my invention, what I claim as new, and desire to secure by Letters Patent, is—

1. In a chuck for turning-lathes, the combination, with a ring adapted to be attached to the dead-spindle of the lathe, of a hub arranged within said ring and a pair of tool-sockets formed integral with or secured to the hub to revolve with it, substantially as set forth.

2. In a chuck for turning-lathes, the combination, with a ring adapted to be attached to the dead-spindle of the lathe and a hub located within said ring and provided on its periphery with a series of holes, of a pair of tool-sockets secured to the hub to revolve with it and a spring-actuated bolt seated on top of the aforesaid ring and projecting through it to co-operate with the holes in the periphery of the hub to lock the hub and attached tool-sockets in the positions to which they may be adjusted, substantially as set forth.

3. The combination, with ring $a$, provided with cap $r$ and spring-actuated bolt $e$, of interior hub $d$, provided with holes in its periphery, and a pair of tool-sockets $f$, secured to hub $d$, and means for locking said tool-sockets in position, substantially as set forth.

4. The combination, with upright flange D, of the tail-stock of the lathe, provided at its top with a roller, as $a'$, and the duplex chuck J, consisting of ring $a$, hub $d$, and tool-sockets $f$, of spring-actuated bolt $e$ and lever $t$, the outer or free end of said lever co-operating with the roller supported by the upright flange D, substantially as set forth.

Signed at New York, in the county of New York and State of New York, this 6th day of September, A. D. 1890.

ERNST LINDNER.

Witnesses:
HUGO KOELKER,
J. E. M. BOWEN.